Nov. 2, 1965 W. B. DELLER ETAL 3,215,782

SWITCHING SYSTEMS EMPLOYING CO-ORDINATE SWITCHING ARRANGEMENTS OF THE CROSS-POINT TYPE

Filed Oct. 23, 1961 4 Sheets-Sheet 3

United States Patent Office 3,215,782

Patented Nov. 2, 1965

3,215,782

SWITCHING SYSTEMS EMPLOYING CO-ORDINATE SWITCHING ARRANGEMENTS OF THE CROSS-POINT TYPE

William Bernard Deller, Mottingham, London, and John Frederick Gatward and Harold James Stirling, Orpington, England, assignors to Associated Electrical Industries Limited, London, England, a British company Filed Oct. 23, 1961, Ser. No. 147,007
Claims priority, application Great Britain, Nov. 4, 1960, 37,989/60
2 Claims. (Cl. 179—18)

This invention relates to switching systems, for example automatic telephone exchange systems, employing co-ordinate switching arrangements of the cross-point type for affording a plurality of possible communication paths which can be taken into use, as required, to establish connections between terminal circuits.

In general a co-ordinate switching arrangement of the cross-point type as herein considered basically comprises two groups of conductors which constitute, in effect, a two co-ordinate array of conductors forming a plurality of cross-points corresponding to the different combinations of two conductors obtained by taking the conductors one from each group at a time. At each of these cross-points a semi-conductor four-zone (or four-layer) diode is connected between the two array conductors that form the particular cross-point and serves as a static switching element having an "off" (or high impedance) condition and an "on" (or low impedance) condition so far as the transmission of communication currents (for example speech currents) between these two conductors is concerned. A complete switching system may comprise a number of interconnected switching stages each comprising a number of these basic co-ordinate switching arrangements.

The semi-conductor four-zone diode provided at each cross-point of such co-ordinate switching arrangement has the electrical characteristic that change from a definite "off," or high impedance, condition to a definite "on," or low impedance, condition, can be effected by applying across the diode a breakdown voltage of more than some minimum magnitude. Once the diode has been changed to the low impedance condition it can be held in that condition by maintaining a direct current bias through it; it immediately reverts to the high impedance condition when the bias current falls below a certain minimum value. Thus selection of a cross-point may be effected by applying respectively to the two array conductors that form the cross-point opposite polarity voltage signals giving a resultant voltage across the cross-point diode at least as great as the amplitude of the breakdown voltage of the diode. With this method of selection all the cross-point diodes connected to the array conductor receiving one such voltage signal, and likewise all the cross-point diodes connected to the array conductor receiving the other such voltage signal, will have the relevant voltage signal applied to them but only the diode at the particular cross-point concerned will have both voltage signals applied to it so that it is alone subjected to a resultant voltage of breakdown magnitude which changes it to its "on" condition, thereby to establish a low impedance connection between the two array conductors. A maintaining circuit established in respect of the selected cross-point provides a holding current for maintaining the cross-point diode in the "on" condition after cessation of the voltage signals.

The present invention concerns a novel circuit arrangement including a number of interconnected basic co-ordinate switching arrangements of the cross-point type (as defined).

According to the invention such circuit arrangement includes for cross-point selection in the several switching arrangements for establishing a communication path therethrough, means for applying to each of the switching arrangements in turn a pair of positive-going and negative-going firing pulses, one pulse to each of the two array conductors concerned in its arrangement, which together give a combined voltage at least as great as the breakdown voltage of the cross-point diodes, one pulse of each pair persisting after the termination of the other to provide a temporary holding current for the particular cross-point diode operated to the low impedance condition by the pulse pair and also for each other cross-point diode thus already operated in respect to the communication path, in any preceding switching arrangement(s), and the pulses of the succeeding pulse pair occurring before the termination of the persisting pulse to operate the relevant cross-point diode in the next switching arrangement to the low impedance condition and to maintain said temporary holding current (which now flows in this latter diode also); the circuit arrangement further including in each interconnection between adjacent switching arrangements individual decoupling rectifier means poled in a sense appropriate for permitting flow of said temporary holding current in operated cross-point diodes but for preventing firing pulses applied across an unoperated cross-point diode in one switching arrangement from reaching, via said interconnections, the cross-point diodes in adjacent switching arrangements.

In order that the invention may be more fully understood reference will now be made to the accompanying drawings in which.

Figure 1:
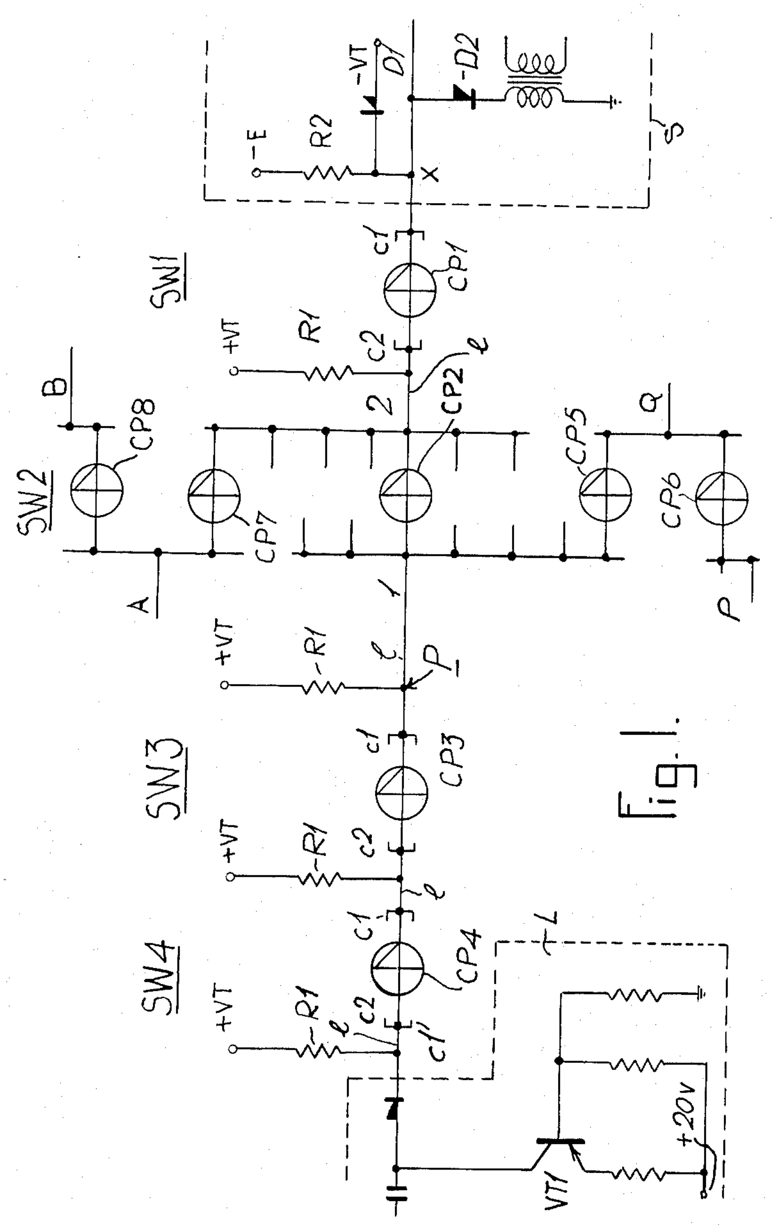
FIG. 1 shows a communication path established through cross-points of a number of co-ordinate switching arrangements which are interconnected and arranged for cross-point selection in known manner.

Referring to FIG. 1, a communication path *p* which is to be established through four inter-connected cross-point diodes CP1, CP2, CP3 and CP4 extends between, for example, a supervisory circuit L and a subscriber's line circuit S. (Only those circuit elements which concern the following description are shown in the supervisory circuit L and the line circuit S.) The four cross-point diodes CP1 to CP4 are respectively located in four successive cross-point switching stages SW1 to SW4 and each of them is typical of a plurality of co-ordinately connected diodes constituting the relevant stage. In the switching stages SW1, SW3 and SW4 the "common" symbols *c1* and *c2* signify the common connection of the cross-point diodes CP1, CP3 and CP4 to other cross-point diodes in their respective co-ordinate arrangements, while the stage SW2, the co-ordinate switching arrangement containing the diode CP2 is somewhat more fully represented by this diode in conjunction with additional cross-point diodes CP5, CP6, CP7 and CP8. In the communication path *p* the interconnections or links *l* between adjacent switching stages and between the stage SW4 and the circuit L are direct connections to each of which a positive voltage +VT for the cross-point diodes can be applied, as and when required, by way of an individual resistance R1.

For the establishment of the communication path *p* the cross-point diodes CP1 to CP4 are required to be changed to their low impedance condition and this is achieved as follows.

A large negative voltage −E is connected through a resistance R2 to a point X in the subscriber's line circuit S at which the latter is connected to the communication path *p*. The potential of this point X is clamped by a diode D1 to prevent it falling below a voltage −VT. The voltages +VT and −VT have magnitudes such that their combined voltage is at least as great as the breakdown voltage of the cross-point diodes. The application of these voltages +VT and −VT to the circuit will result firstly in the cross-point diode CP1 being changed to the low impedance condition. When this happens, the voltage −VT is effectively extended through the diode CP1 to the diode CP2, which is in turn changed to the low impedance condition by the resultant application of voltages +VT and −VT to it. The remaining cross-point diodes CP3 and CP4 are likewise changed to the low impedance in turn when the voltage −VT is extended to them, until the communication path *p* is completely established between the supervisory circuit L and the subscriber's line circuit S. A transistor VT1 in the supervisory circuit L is subsequently rendered conducting (in a manner not shown) and supplies a holding current to the communication path *p*.

This holding current causes the voltage at the point X to rise above earth, thereby reverse-biasing the diode D1 and forward-biasing another diode D2. The voltage +VT can now be removed from the circuit and the cross-point diodes are maintained in the low impedance condition by the holding current flowing from the transistor VT1 in the supervisory circuit L to earth in the subscriber's line circuit S. When the communication path *p* is to be interrupted, the transistor VT1 is rendered non-conducting once again so terminating the holding current, with the result that the cross-point diodes CP1 to CP4 revert to the high impedance condition.

Figure 2:
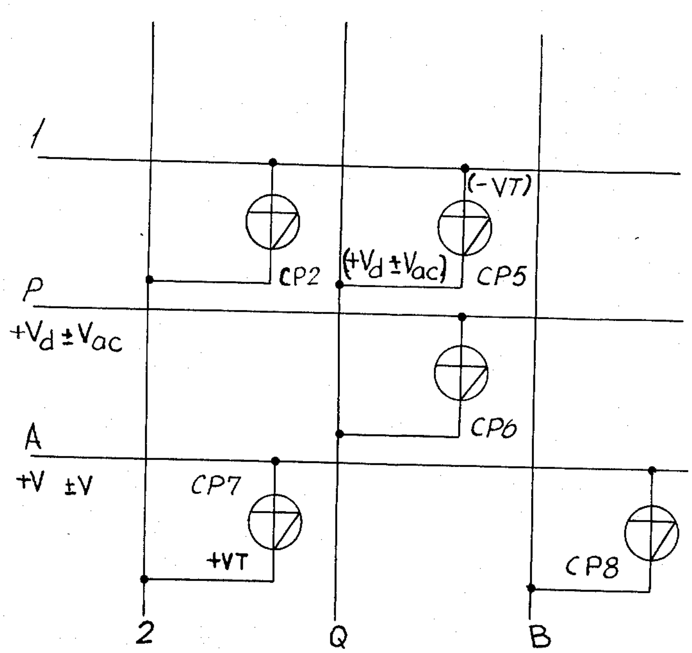
FIG. 2 shows in more detail one of the co-ordinate switching arrangements illustrated in FIG. 1.

During the time that the communication path *p* is established a potential gradient is set up between one end of the path and the other, resulting in standing potentials being present at various points along the path: furthermore, the flow of A.C. intelligence currents in the path can vary these standing potentials. It is evident that similar standing potentials will also be present in any other communication path established through the co-ordinate switching arrangements. For instance, if a call has been previously established over intermediate links P and Q and cross-point diode CP6, and another over intermediate links A and B and cross-point diode CP8, then one electrode of each of the cross-point diodes CP5 and CP7 will be at a standing potential varying between $+v_d \pm v_{ac}$, where $v_d$ is the standing potential due to the holding current and $v_{ac}$ is the potential due to A.C. intelligence currents. Thus, when the voltage +VT is applied to the cross-point diodes CP1 to CP4, the second electrodes of the two cross-point diodes CP5 and CP7 will receive voltages varying between +VT and −VT, and these diodes will therefore experience large reverse voltages made up of (+VT) and $(+v_d - v_{ac})$ in the case of cross-point diode CP7 and (−VT) and $(+v_d + v_{ac})$ in the case of cross-point diode CP5. These reverse voltages are more clearly seen in FIG. 2 which shows the co-ordinate arrangement in the switching stage SW2 re-arranged in matrix form and in which array conductors 1 and 2 are included in the communication path *p*. When the cross-point diode CP1 (FIG. 1) is being changed to its low impedance condition the voltage +VT is applied to the array conductor 2 and consequently a maximum reverse voltage of (+VT) and $(+v_d - v_{ac})$ can appear across the cross-point diode CP7. Similarly, when the cross-point diode CP2 is in the low impedance condition the voltage −VT on the array conductor 2 is extended through this diode to the array conductor 1 so that the cross-point diode CP5 can experience a maximum reverse voltage of (−VT) and $(+v_d + v_{ac})$.

It is therefore evident that for the arrangement shown in FIG. 1, the reverse breakdown voltage of its cross-point diodes must be greater than the maximum reverse voltage liable to be experienced by the diodes. In consequence, in the design of such arrangement, specification of a high reverse breakdown voltage of the cross-point diodes is required in addition to specification of their forward breakdown voltage and maintaining current.

Figure 3:
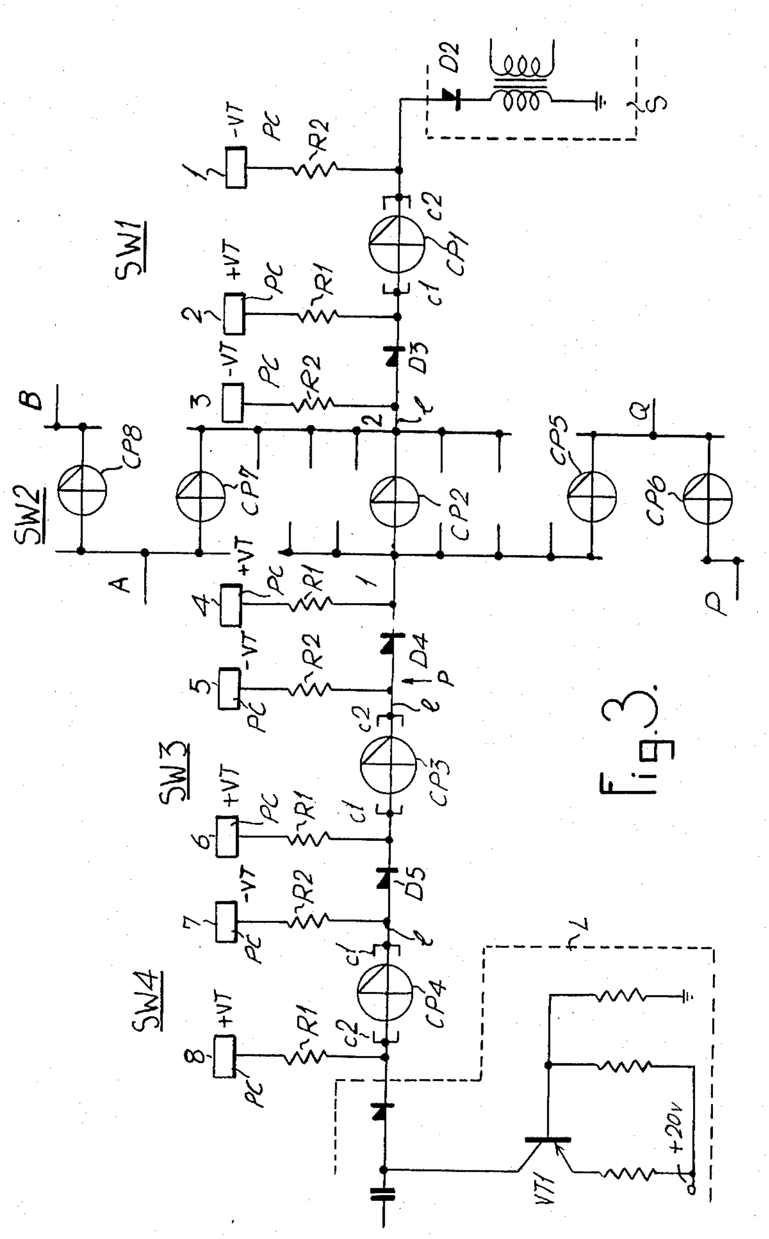
FIG. 3 shows a communication path established through cross-points of a number of co-ordinate switching arrangements included in a circuit arrangement embodying the invention.

The arrangement embodying the invention as shown in FIG. 3 avoids the need for specifying a high reverse breakdown voltage of the cross-point diodes to be used therein. This arrangement is similar to the arrangement of FIG. 1 except that each intermediate link *l* included in the communication path *p* includes a decoupling diode (diodes D3, D4 and D5) and that for establishing this path a pair of firing pulses of voltages +VT and −VT is applied sequentially to the relevant cross-point diodes through individual resistances R1 and R2. (Pulse applying circuits providing the firing pulses +VT and −VT are indicated by the rectangles PC and may take any suitable form.)

Figure 4:
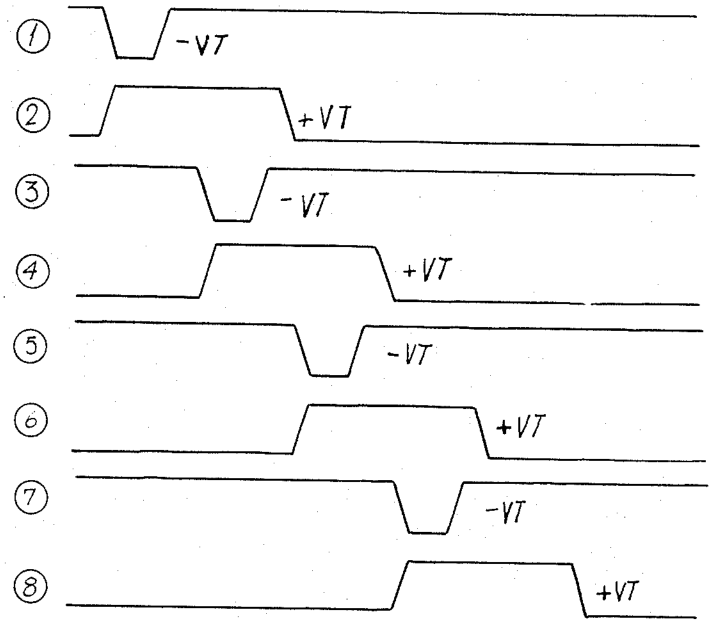
FIG. 4 illustrates digrammatically the approximate waveforms of, and time relationship between, voltage pulses employed for the arrangement of FIG. 3.

The timing and sequence of firing pulses applied to the arrangement is shown in FIG. 4. For establishing the communication path *p* in this instance the cross-point diode CP1 is changed to the low impedance condition by pulses 1 and 2 at which time diode D2 becomes forward biased. When pulse 1 ends the cross-point diode CP1 is held in this condition by current from pulse 2 which is still present. Pulses 3 and 4 change the cross-point diode CP2 to the low impedance condition and when pulses 2 and 3 end, the diode D3 is forward biased as well as diode D2 and the cross-point diodes CP1 and CP2 are held in their low impedance condition in series, by current from pulse 4. The remaining cross-point diodes CP3 and CP4 are changed to the low impedance condition in similar fashion, the pulse sequence being arranged so that the pulses do not end before the appropriate decoupling diodes D4 or D5 are forward biased. Before a cross-point diode is changed to the low impedance condition the decoupling diodes in the intermediate links *l* on each side of the co-ordinate arrangement in which the cross-point diode is located are reverse biased and thereby prevent the firing pulses from being applied to adjacent co-ordinate arrangements and thus across the cross-point diodes therein in a reverse direction. In this instance, therefore, with the communication paths already established by links P and Q and cross-point diode CP6, and links A and B and cross-point diode CP8, the maximum reverse voltage across cross-point diodes CP5 and CP7 is only that due to the standing potential is therefore significantly less than that present in the arrangement of FIG. 1.

The arrangement of FIG. 3 does not therefore require the cross-point diodes employed therein to have such a large reverse breakdown voltage. Moreover, it allows the use of different amplitude firing pulses in the successive switching stages in the manner disclosed in our co-pending application Serial No. 134,278.

A characteristic of a four-zone diode is that, on applying across it a voltage such as to produce breakdown, the necessary magnitude of this voltage is to some extent determined by its rise time: that is, in general and within limits, a four-zone diode has a lower breakdown voltage the faster is the rise time of a voltage applied across it, the variation of breakdown voltage being as much as 10% in a given diode. In the known arrangement of FIG. 1, the rise time of the voltage −VT is dependent upon the speed of switching of the previous stage (which can occur very rapidly, i.e. in a fraction of a microsecond) resulting in an unpredictable variation in cross-point breakdown voltage which is incompatible with the close tolerances which have to be observed. In contrast, in the arrangement of FIG. 3, the firing pulses may be readily controlled so as to have a predetermined known rise time, thus affording a distinct advantage of this arrangement over the known arrangement of FIG. 1. Furthermore, since breakdown of each cross-point diode is effected by its own pair of firing pulses whose rise times can be individually regulated, the sequential testing of each cross-point is facilitated.

Also, the method of cross-point switching in the known arrangement of FIG. 1 necessitates a large ratio between the maximum allowable current through a cross-point diode and the minimum current required to maintain the diode in its "on" condition: that is, the first stage cross-point diode to be switched has initially to carry not only its own holding current, but also the holding currents for all the cross-point diodes to be switched in succeeding stages. In a large system the total current may amount to as much as ten times the holding current of one stage. The arrangement of FIG. 3 needs a much lower ratio between maximum and minimum currents and therefore allows a wider tolerance in the specification of the cross-point diodes.

Figure 5:
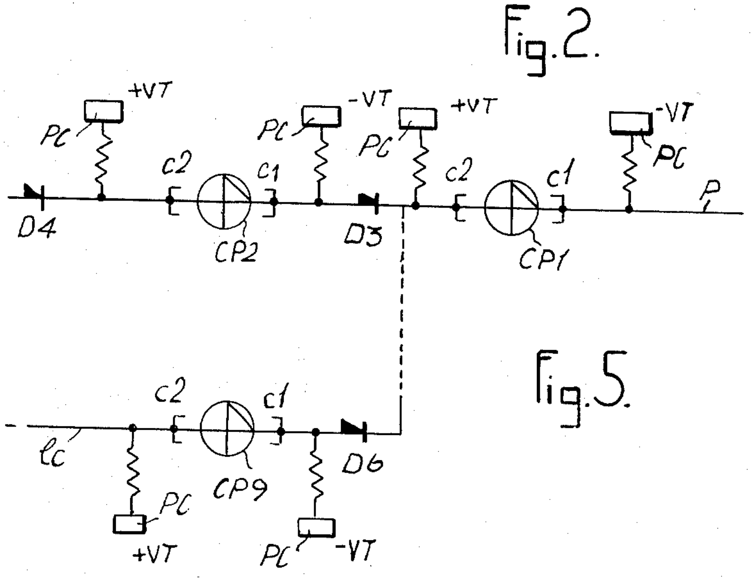
FIG. 5 shows additional circuitry which may be associated with the circuit arrangement of FIG. 3.

Another advantage of the arrangement shown in FIG. 3 is that due to the presence of decoupling diodes in the intermediate links *l* it is possible to tee-in to an established communication path from an external circuit. Such a circuit, which may for instance, be an operator's enquiry circuit by which an exchange operator can gain access to a speech path established between two subscribers in an automatic telephone exchange, is shown in FIG. 5. In this circuit connection of the path *ec* to the path *p* is effected simply by changing the cross-point diode CP9 to the low impedance condition by application of firing pulses +VT and −VT. This action does not affect the path *p* in any way since the negative voltage pulse −VT reverse biases the decoupling diode D6, thereby avoiding, for example, loud clicks at a subscriber's telephone instrument connected to the already established path *p*.

What we claim is:

1. A circuit arrangement comprising: a plurality of co-ordinate switching networks having cross-point switches constituted by two-terminal 4-layer diodes; linking connections interconnecting said networks to provide therethrough a plurality of possible communication paths each of which includes a cross-point diode in each said network; pulse means for individually applying to the terminals of each cross-point diode in a communication path to be established a pair of contemporaneously occurring switching voltage pulses of opposite polarities and of magnitudes together producing across the diode a voltage at least as great as the diode's forward breakdown switching voltage, the pulse means applying such pulse pairs in succession to the several cross-point diodes included in said communication path and with such timing that one pulse of each pair persists after the termination of the other until after the application of the switching pulses to the next cross-point diode in said path whereby to provide a temporary holding current for the cross-point diode switched on by the pulse pair and also for each other cross-point diode already switched on in the communication path; and pulse isolating rectifier means included in said linking connections and poled in the sense permitting flow of said temporary holding current in switched-on cross-point diodes but preventing switching voltage pulses applied to the terminals of a cross-point diode in one of said networks from reaching, over said linking connections, the cross-point diodes in adjacent networks.

2. A circuit arrangement as claimed in claim 1 and further including an additional co-ordinate switching network having cross-point switches constituted by respective two-terminal 4-layer diodes, additional connections connecting said additional network to said linking connections interconnecting two of the first mentioned networks, and additional pulse isolating rectifier means included in said additional connections and poled in the sense permitting flow of holding current from an established communication path to a switched-on cross-point diode in said additional network, but preventing switching voltage pulses applied to the terminals of a cross-point diode in said additional network from reaching said established communication path.

References Cited by the Examiner

UNITED STATES PATENTS

| | | | |
|---|---|---|---|
| 2,946,855 | 7/60 | Hussey | 179—18 |
| 2,951,124 | 8/60 | Hussey et al. | 179—18 |
| 3,027,427 | 3/62 | Woodin | 179—18 |
| 3,033,936 | 5/62 | Simma | 179—18 |
| 3,055,982 | 9/62 | Kowalik | 179—18 |

ROBERT H. ROSE, *Primary Examiner.*

WALTER L. LYNDE, *Examiner.*